United States Patent [19]
Bose et al.

[11] Patent Number: 5,807,428
[45] Date of Patent: Sep. 15, 1998

[54] SLURRY COATING SYSTEM

[75] Inventors: Krishnangshu Bose, Manchester, Conn.; Terry T. Perry, Bar Mills, Me.; David W. LaFlamme, Colchester; Lester J. Magyar, Wallingford, both of Conn.

[73] Assignee: United Technologies Corporation, Hartford, Conn.

[21] Appl. No.: 862,115

[22] Filed: May 22, 1997

[51] Int. Cl.⁶ ...................................................... C09D 5/08
[52] U.S. Cl. ................................... 106/14.44; 106/14.05; 106/14.11; 106/14.21
[58] Field of Search ............................. 106/14.05, 14.11, 106/14.21, 14.44

[56] References Cited

U.S. PATENT DOCUMENTS

| | | | |
|---|---|---|---|
| 4,132,816 | 1/1979 | Benden et al. | 427/237 |
| 5,217,757 | 6/1993 | Milaniak et al. | 427/253 |
| 5,366,765 | 11/1994 | Milaniak et al. | 427/229 |

FOREIGN PATENT DOCUMENTS

| | | |
|---|---|---|
| 2007494 | 2/1994 | Russian Federation . |
| 390196 | 11/1973 | U.S.S.R. . |
| 406969 | 6/1974 | U.S.S.R. . |
| 443941 | 7/1975 | U.S.S.R. . |
| 1145054 | 3/1985 | U.S.S.R. . |
| 1168626 | 7/1985 | U.S.S.R. . |
| 1523594 | 11/1989 | U.S.S.R. . |
| 1539235 | 1/1990 | U.S.S.R. . |

*Primary Examiner*—Erma Cameron
*Attorney, Agent, or Firm*—Bachman & LaPointe, P.C.

[57] ABSTRACT

The present invention relates to a composition for coating internal surfaces of an airfoil, particular high pressure temperature airfoils such as vanes and blades. The composition includes a dry composition consisting essentially of from about 2.5 wt % to about 7.0 wt % aluminum fluoride, from about 5.0 wt % to about 20 wt % of a chromium-aluminum powder, and from about 75 wt % to about 92.5 wt % $Al_2O_3$. The dry composition is mixed with water and a cellulose compound to form a slurry which is thereafter injected into the airfoil. The coating compositions of the present invention are valuable in that they are capable of forming an oxidation and corrosion resistant coating on the internal surfaces of the airfoil simultaneously with the formation of an exterior corrosion and oxidation resistant coating. A process for simultaneously forming corrosion and oxidation resistant coatings on the interior and exterior surfaces of an airfoil is described herein.

6 Claims, 1 Drawing Sheet

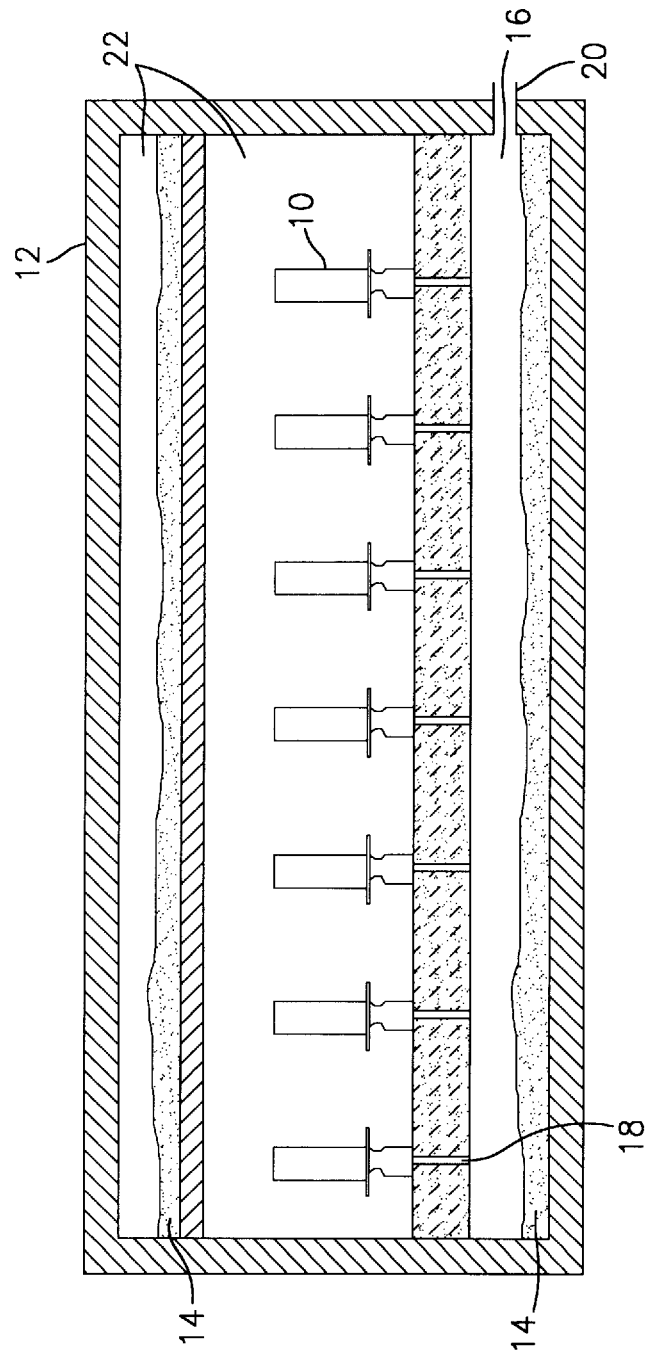
(PRIOR ART)

SLURRY COATING SYSTEM

BACKGROUND OF THE INVENTION

The present invention relates to a process for coating an airfoil to protect it against oxidation and corrosion during operation and to a particular coating composition used to form an oxidation and corrosion resistant coating on internal surfaces of said airfoil.

Aluminide coatings are applied on nickel-based superalloy turbine airfoils to protect the airfoils against oxidation and corrosion during operation in the turbine section of engines. These coatings are formed by the deposition of aluminum onto the surfaces of the airfoils. A reaction occurs between the nickel in the airfoil material and the deposited aluminum to form nickel-based aluminides. At high temperatures, in the presence of air, the aluminum in the nickel aluminide coating forms a thin, adherent aluminum oxide at the surface of the coating. This aluminum oxide provides a barrier against further oxidation and corrosion of the turbine airfoil. The external surfaces of turbine airfoils in most engines are coated with aluminides. The performance requirements of the engines determine whether aluminide coatings also are required on the internal surfaces of the airfoils.

Currently, there are two processes used to internally coat airfoils. One process employs a slurry technique and is used for airfoils that operate in the low pressure turbine section of an engine. The second process uses chemical vapor deposition to coat the internal surfaces of the airfoils for the high pressure turbine section of an engine. Different coating processes are employed for the two different types of airfoils because the high pressure turbine section of an engine operates at a higher temperature and pressure than the low pressure turbine section of an engine. As a result, the coating applied to high pressure turbine airfoils must have higher temperature capacity and must be more robust than those applied to low pressure turbine airfoils.

U.S. Pat. No. 5,366,765 to Milaniak et al. describes a slurry technique for coating internal passages in low pressure turbine airfoils. The slurry described in this patent cannot be used to coat the internal passages of high pressure turbine airfoils for the following reasons:

(1) the slurry produces a coating that is too brittle;

(2) the coating is too thick to apply to the internal cooling passages of high pressure turbine airfoils; and (3) it is not compatible with the processes used to coat the external surfaces of airfoils.

As previously mentioned, chemical vapor deposition processes are used to coat airfoils used in the high pressure turbine section of an engine. During the coating process, turbine airfoils 10 are placed in an upright position within a compartmentalized, large metal box or coating fixture 12, called a coat boat. The FIGURE illustrates a typical coat box arrangement. To coat the internal passages of the airfoils 10, chemicals 14 are placed in a compartment 16 below the airfoils. The airfoils are mounted on specialized plumbing tools 18 that allow vapors to flow through the internal cooling passages of the airfoils. Argon gas is introduced into the lower compartment 16 via inlet 20 to force the coating vapors through the internal areas of the airfoils. These vapors react with the internal surfaces of the airfoil to produce an aluminide coating. At the same, chemicals 14 in an upper compartment 22 create vapors which react with the external surfaces of the airfoil to form an aluminide coating thereon. There are problems however associated with this process. The problems include the need to use a forced argon flow and the need to use specialized plumbing tools to allow the coating vapors to flow through the internal passages of the airfoil.

Thus, there remains a need for a coating process which eliminates the problems associated with the chemical vapor deposition processes currently employed. There is also a need for a coating process which allows the external and internal surfaces of an airfoil to be coated during a single cycle.

SUMMARY OF THE INVENTION

Accordingly, it is an object of the present invention to provide a composition for forming a corrosion and oxidation resistant coating on internal surfaces of airfoils.

It is a further object of the present invention to provide a coating composition as above which is compatible with processes used to coat external surfaces and therefore allows the internal surfaces of an airfoil to be coated simultaneously with the external surfaces of the airfoil.

It is yet a further object of the present invention to provide a coating process which does not need any forced argon flow and/or specialized plumbing within the coat box.

The foregoing objects are attained by the coating composition and the coating process of the present invention.

In accordance with the present invention, a composition for providing a corrosion and oxidation resistant coating on the internal surfaces of an airfoil includes a dry composition consisting essentially of from about 2.5 wt % to about 7.0 wt % aluminum fluoride, from about 5.0 wt % to about 20 wt % of a chromium-aluminum powder, and from about 75 wt % to about 92.5 wt % aluminum fluoride. The dry composition is mixed with water and a cellulose compound to form a slurry composition which can be directly applied to the internal surfaces of an airfoil, thereby eliminating the need for an argon purge and the need for specialized plumbing.

In accordance with the coating process of the present invention, the aforementioned slurry is formed by providing the aforementioned dry chemical composition and mixing the dry chemical composition with the cellulose compound and water. Thereafter, the slurry composition is placed into direct contact with the internal surfaces of the airfoil. After the airfoil with the slurry composition therein has been baked so as to remove the water and to harden the solids in the slurry composition, the airfoils are placed within a coating fixture. Also placed in the coating fixture is a chemical composition for coating the exterior surfaces of the airfoil. Thereafter heat is applied for a time sufficient to form a protective coating on the exterior surfaces of the airfoil and simultaneously form a protective coating on the internal surfaces.

Further details of the composition and the process of the present invention, as well as further objects and advantages, are set forth in the following detailed description and the accompanying drawings, wherein like reference numerals depict like elements.

BRIEF DESCRIPTION OF THE DRAWINGS

The FIGURE illustrates a prior art coating fixture for coating internal and external surfaces of an airfoil.

DETAILED DESCRIPTION OF THE PREFERRED EMBODIMENT(S)

A first aspect of the present invention is the use of a slurry composition to coat the interior surfaces of airfoils such as high pressure turbine blades and vanes. As previously discussed, the primary purpose of the coating formed from the slurry of the present invention is to increase the oxidation and corrosion resistance of nickel alloy turbine airfoils.

Compositions in accordance with the present invention for coating the internal surfaces of an airfoil include a dry composition consisting essentially of from about 2.5 wt % to about 7.0 wt % aluminum fluoride, from about 5.0 wt % to about 20 wt % of a chromium-aluminum powder, and from about 75 wt % to about 92.5 wt % $Al_2O_3$. The chromium-aluminum powder in the dry composition preferably comprises a chromium-45 aluminum powder. The aluminum fluoride and the chromium-aluminum powder form the active elements in the coating compositions of the present invention. In a preferred embodiment, the dry composition consists essentially of from about 2.5 wt % to about 5.0 wt % aluminum fluoride, from about 15 wt % to about 20 wt % of the chromium-45 aluminum powder, and from about 75 wt % to about 80 wt % $Al_2O_3$. In a most preferred embodiment, the $Al_2O_3$ constituent is in a range of from about 75 wt % to about 77.5 wt %.

In order to be applied to the internal surfaces of the airfoil, the dry composition must be converted into a slurry composition. This is accomplished by mixing the dry composition with non-active ingredients including water and a cellulose compound known as METHOCEL® Suitable slurry compositions can be formed by adding water in a range of from about 1900 to about 2700 cc and by adding the cellulose compound in a range of from about 60 to about 100 grams. The water may be heated to aid in dissolving the cellulose compound. Any commercially available cellulose compound is usable. A preferred compound is METHOCEL® brand cellulose compound which is distributed by The Dow Chemical Company, Midland, Mich. A suitable coating slurry can be manufactured by adding 2300 cc of water and 80 grams of Methocel to the dry compositions of the present invention.

After the slurry composition has been formed, it is placed into direct contact with the internal surfaces of the airfoil. This is done by injecting the slurry into the interior of the turbine airfoils. Typically, the airfoils have internal passageways and the slurry is injected into the passageways. Any suitable means known in the art may be used to inject the slurry into the internal passages of or otherwise place it into contact with the internal surfaces of the airfoil. For example, the slurry may be placed into contact with the internal surfaces of the airfoil using the technique shown in U.S. Pat. No. 5,366,765 to Milaniak et al., which is hereby incorporated by reference herein. Once the slurry composition has been injected into the interior of the airfoil, the airfoil is baked to remove water and harden the slurry solid. Typically, the baking operation consists of subjecting the airfoils with the injected slurry therein to a temperature in the range of from about 1025° F. to about 1075° F. for a time in the range of from about 30 minutes to about 2 hours. Any suitable means known in the art may be used to bake the airfoils.

The coating compositions of the present invention are compatible with the CVD processes used to coat the external surfaces of airfoils. Thus, it is possible using the coating composition of the present invention to simultaneously form oxidation and corrosion resistant coatings on both the exterior and the interior surfaces of the airfoil. To do this, a number of airfoils containing the baked slurry compositions are placed in an upright manner in a metal coating fixture similar to that shown in the FIGURE. The chemical composition for coating the external surfaces of the airfoil is also placed in the fixture. One suitable exterior surface coating composition which can be utilized consists essentially of 15.4 wt % aluminum fluoride and 84.6 wt % of chromium-45 aluminum. When heated to temperatures above 1975° F., the exterior surface chemical composition vaporizes and deposits aluminum onto the exterior surfaces of the airfoils. The internal surfaces of the airfoil are simultaneously coated by direct diffusion of aluminum from the hardened slurry composition. A typical thermal cycle applied during this simultaneous coating operation comprises an initial coat cycle during which a temperature in the range of 1950° F. to about 2050° F. is applied for a time in the range of 4 to 10 hours and thereafter a diffusion heat cycle is performed by applying heat at a temperature in the range from about 1950° F. to about 2050° F. for a time in the range of 4 to 7 hours. As final steps in the process of the present invention, the airfoils are heat tint treated at a temperature of about 1075° F. for about 1 hour to determine coat quality and thereafter precipitation heat treated at a temperature of about 1300° F. to about 1600° F. for a time period in the range of 12 to 32 hours.

To demonstrate the coating which can be obtained using the present invention, six slurry compositions were prepared in accordance with the present invention. The six slurry compositions contained the dry compositions set forth in Tables 1 and 2. A seventh slurry composition was prepared using the PWA 273 dry composition set forth in Tables 1 and 2. After each of the dry compositions was prepared, 2300 grams of water and 80 grams of Methocel were added to form a slurry. The various slurries were then injected into the internal passages of a number of high pressure turbine airfoils. The coating trial was then completed at a coating temperature of 1975° F. for a coat time of 4 hours. The objects of the test were to obtain a coating thickness between 1.5 and 2 mils and that there be no bare spots.

TABLE 1

| Slurry | Dry Composition | Avg. Coat Thickness (mils) | Max. Coat Thickness (mils) | Min. Coat Thickness (mils) |
|---|---|---|---|---|
| 1 | 2.5 wt % $AlF_3$<br>5 wt % Cr-45Al<br>92.5 wt % $Al_2O_3$ | 0.75 | 1.7 | 0 |
| 2 | 5 wt % $AlF_3$<br>5 wt % Cr-45Al<br>90 wt % $Al_2O_3$ | 0.57 | 1.7 | 0.0003 |
| 3 | 2.5 wt % $AlF_3$<br>15 wt % Cr-45Al<br>82.5 wt % $Al_2O_3$ | 0.98 | 1.7 | 0.0005 |
| 4 | 5 wt % $AlF_3$<br>15 wt % Cr-45Al<br>80 wt % $Al_2O_3$ | 1.4 | 1.7 | 1.0 |
| 5 | 5 wt % $AlF_3$<br>20 wt % Cr-45Al<br>75 wt % $Al_2O_3$ | 1.8 | 2.3 | 1.4 |
| 6 | 2.5 wt % $AlF_3$<br>20 wt % Cr-45Al<br>77.5 wt % $Al_2O_3$ | 1.75 | 2.0 | 1.5 |
| 7 (PWA 273 composition) | 5 wt % $AlF_3$<br>30 wt % Cr-45Al<br>65 wt % $Al_2O_3$ | 2.0 | 3.0 | 1.2 |

TABLE 2

| Slurry | Dry Composition | Avg. Coat Thickness (mils) | Max. Coat Thickness (mils) | Min. Coat Thickness (mils) |
|---|---|---|---|---|
| 1 | 2.5 wt % $AlF_3$<br>5 wt % Cr-45Al<br>92.5 wt % $Al_2O_3$ | 0.82 | 1.7 | 0 |
| 2 | 5 wt % $AlF_3$<br>5 wt % Cr-45Al<br>90 wt % $Al_2O_3$ | 0.87 | 1.5 | 0 |
| 3 | 2.5 wt % $AlF_3$<br>15 wt % Cr-45Al<br>82.5 wt % $Al_2O_3$ | 1.4 | 2.0 | 1.0 |
| 4 | 5 wt % $AlF_3$<br>15 wt % Cr-45Al<br>80 wt % $Al_2O_3$ | 1.3 | 1.5 | 1.0 |
| 5 | 5 wt % $AlF_3$<br>20 wt % Cr-45Al<br>75 wt % $Al_2O_3$ | 1.8 | 2.1 | 1.5 |
| 6 | 2.5 wt % $AlF_3$<br>20 wt % Cr-45Al<br>77.5 wt % $Al_2O_3$ | 1.8 | 2.2 | 1.5 |
| 7 (PWA 273 composition) | 5 wt % $AlF_3$<br>30 wt % Cr-45Al<br>65 wt % $Al_2O_3$ | 0.83 | 2.0 | 0 |

As can be seen from the data in Tables 1 and 2, the coating compositions of the present invention met the target goals.

The coating compositions of the present invention yield a coating which provides oxidation and corrosion resistance under the conditions at which high pressure turbine airfoils, such as high pressure turbine blades and vanes, operate. These coatings are achieved in an economically beneficial fashion without the need for coating fixtures that have a bottom compartment connected to an argon flow pipe and without specialized plumbing therein.

As can be seen from the test data reported above, the coating compositions of the present invention resulted in a uniform coating within these desired coating parameters needed for repeatable, robust coating processes.

Although this invention has been shown and described with respect to detailed embodiments thereof, it will be understood by those skilled in the art the various changes, omissions, and additions in form and detail thereof may be made without departing from the spirit and scope of the claimed invention.

What is claimed is:

1. A composition for providing an oxidation and corrosion resistant coating on internal surfaces of an airfoil, said composition including a dry composition consisting essentially of from about 2.5 wt % to about 7.0 wt % aluminum fluoride, from about 5.0 wt % to about 20 wt. % of a chromium-aluminum powder, and from about 75 wt % to about 92.5 wt % $Al_2O_3$.

2. The composition of claim 1 wherein said chromium-aluminum powder comprises a chromium-45 aluminum powder.

3. The composition of claim 1 further comprising a cellulose compound and water added to said dry composition so as to form a slurry composition to be injected into said airfoil.

4. The composition of claim 1 wherein said dry composition consists essentially of from about 75 wt % to about 80 wt % of $Al_2O_3$, from about 2.5 wt % to about 5.0 wt % aluminum fluoride, and from about 15 wt % to about 20 wt % chromium-aluminum powder.

5. The composition of claim 4 wherein said dry composition includes from about 75 wt % to about 77.5 wt % $Al_2O_3$.

6. The coating composition of claim 3 wherein said slurry composition is used to coat external surfaces of said airfoil.

* * * * *